United States Patent

Peng

[11] Patent Number: 6,056,156
[45] Date of Patent: May 2, 2000

[54] CAULKING GUN WITH A BUILT-IN SPOUT CUTTER

[76] Inventor: Yuenan Peng, 32385 Lake Pleasant Dr., Westlake Village, Calif. 91361

[21] Appl. No.: 09/190,797

[22] Filed: Nov. 12, 1998

[51] Int. Cl.[7] .............................. B67D 5/00; G01F 11/06; B26D 5/08
[52] U.S. Cl. ................. 222/82; 222/326; 83/580
[58] Field of Search ................ 222/82, 83, 83.5, 222/326; 83/580; 30/1.5, 226, 233, 261

[56] References Cited

U.S. PATENT DOCUMENTS

| | | | |
|---|---|---|---|
| 4,135,644 | 1/1979 | Pacetti | 222/81 |
| 4,390,115 | 6/1983 | Bigham | 222/326 |
| 4,493,437 | 1/1985 | Breeden | 222/82 |
| 4,802,607 | 2/1989 | Johnson | 222/82 |
| 5,860,568 | 1/1999 | Mallalieu et al. | 222/83.5 |

Primary Examiner—Joseph A. Kaufman
Assistant Examiner—Keats Quina Hy

[57] ABSTRACT

A caulking gun has a built-in cutter being formed between a handle (14) and a trigger (18) for cutting off a tip (34) of a caulking spout (36). The cutter has a cutting blade (62) being mounted in the handle and a cutting forwarder (40) for pushing the spout to the blade for cutting. One end of the cutting forwarder together with a tension spring (46) is pivoted in the trigger and another end reclines against the handle. A blade slot (60) on the top of the forwarder covers the blade for finger protection. A pair of openings (54, 55) are located in the two side wells of the blade slot of the forwarder for receiving the spout from either right side or left side of the caulking gun for cutting. The surfaces of the openings force a spout inside the openings to the blade with an angle less than 90° for smoothly spout cutting while the trigger is squeezed. A cutting pusher (66) locates in the trigger under the forwarder pushing a cutting surface (58) on the bottom of the blade slot completely closing to a sharp edge (64) of the blade for finally cutting the tip off the spout.

1 Claim, 2 Drawing Sheets

CAULKING GUN WITH A BUILT-IN SPOUT CUTTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to a caulking gun having a built-in cutter for cutting the tip off the spout of a caulking cartridge.

Caulking gun is a device to squeeze caulking material inside a caulking cartridge out of a funnel-like plastic spout of the caulking gun or the caulking cartridge. Caulking guns could be classified into two types. The first type is those caulking guns that have caulking function but without a built-in cutter for cutting off a tip of the funnel-like plastic spout. A user has to find a knife or a scissors to cut the spout tip off before caulking, such as U.S. Pat. No. 3,069,053 to Nelson, U.S. Pat. No. 4,461,407 to Finnegan and U.S. Pat. No. 5,615,807 to me. The second type is a caulking gun having caulking function and a built-in cutter for cutting off the tip of the plastic spout. There are several designs of caulking guns with built-in cutters for cutting the tips off, for example, U.S. Pat. No. 3,189,226 to Sherbondy, U.S. Pat. No. 4,135,644 to Pacetti, U.S. Pat. No. 4,390,115 to Bigham and U.S. Pat. No. 4,493,437 to Breeden.

The caulking gun with built-in cutter lets a user more convenient to do caulking job. However, all prior designs of caulking gun with built-in cutter have at least the following disadvantages:

(a) There are two types of frame-handle structure for all caulking guns. One structure has a U-shape cross section of handle made of stamped steel sheet, such as U.S. Pat. No. 2,786,603 to Collins. Another structure has a non-U-shape cross section of handle manufactured by die casting, plastic injection or other methods, such as the caulking gun shown in U.S. Pat. No. 5,156,305 to Eyre. Ether caulking guns with U-shape handle or with Non-U-shape handle are widely used in caulking jobs. Any of built-in spout cutters of prior arts can be built in only a caulking gun with a U-shape handle, but not a caulking gun with a Non-U-shape handle. Not just because these built-in cutters of prior art are all designed for building in the caulking guns with U-shape handle, but also because the U-shape handle provides a cover for the sharp cutting edge for finger protection of a caulking gun user.

(b) The principles of spout cutting of all built-in cutters of prior art are scissors-like function. However, it is difficult to manufacture a built-in cutter of a caulking gun as a good function of scissors. Those unperfected scissors-like cutters are hard to cut off the spout tip completely. Even a spout tip is cut off by the scissors-like cutter, however, the spout opening does not have a desirable shape for doing a nice caulking job in many cases.

(c) The cutting operation is not smooth and needs big force when those unperfected scissors-like cutters are used.

(d) Those spout cutters can not be convenient for both right-hand users and left-hand users because a cutter can be formed on only one side of a caulking gun.

BRIEF SUMMARY OF THE INVENTION

Accordingly, several objects and advantages of the present invention are:

(a) to provide a caulking gun with a non-U-shape handle to have a built-in spout cutter which is safe to a caulking gun user;

(b) to provide a caulking gun with a built-in cutter which can cut the spout tip completely and obtain a desirable shape of spout opening;

(c) to provide a caulking gun with a built-in cutter which has smooth operation of spout cutting and needs a small force for cutting; and (d) to provide a caulking gun with a built-in cuter which is convenient to both right-hand user and left-hand user;

A further object of the present invention is to have the cutting blade to be easily exposed for sharpening by a file or for cleaning up.

The present invention meets these objects. This invention provides a caulking gun having a caulking cartridge-receiving frame for placing a caulking cartridge; a Non-U-shape handle for holding the caulking gun; a plunger shaft axially movable in the frame for forwardly urging the caulking material from the gun, a trigger mechanism movably engaging and forwardly advancing the plunger shaft in response to reciprocal operation of the trigger mechanism, the trigger mechanism having a released position for permitting rearward movement of the plunger shaft; a stop mechanism of rearward movement of the plunger shaft. The caulking gun has a built-in cutter being formed between the non-U-shape handle and the movable trigger for cutting the spout tip of the caulking cartridge.

The built-in cutter has a cutting-blade being mounted on the handle and has a cutting forwarder beneath the cutting blade. One end of the cutting forwarder is pivoted together with a tension spring in the trigger, and another free end of the cutting forwarder reclines upwardly against the handle since the spring force of the tension spring. The free end of the cutting forwarder slides along the handle in response to pivotal movement of the trigger. The built-in cutter also has a cutting blade slot of formed in the top of the cutting forwarder facing to the cutting blade for covering the sharp edge of the cutting blade for finger protection of a caulking gun user. A pair of receiving openings are located on the two walls of the cutting-blade slot in the cutting forwarder for receiving a spout from either right or left side of the caulking gun for cutting. The two surfaces of the two receiving openings act as forcing surfaces for forcing the spout inside the openings toward the cutting blade during a spout cutting process. A flat cutting surface is located on the bottom of the cutting blade slot for completely closing up to the sharp edge of cutting blade while the trigger is squeezed from its released position to its extremity position. A cutting pusher is located in the trigger under the cutting forwarder acting together with the pivot of cutting forwarder for pushing the cutting surface of the cutting forward closing up to the sharp edge of cutting blade for finally cutting off the spout tip.

It makes a spout cutting process smoothly and much easily that the cutting forwarder forces a spout from one end to another end of the cutting blade with an angle less than 90° and then the cutting pusher pushes the cutting surface for finally cutting spout tip off.

DETAILED DESCRIPTION OF THE INVENTION

Figure 1:
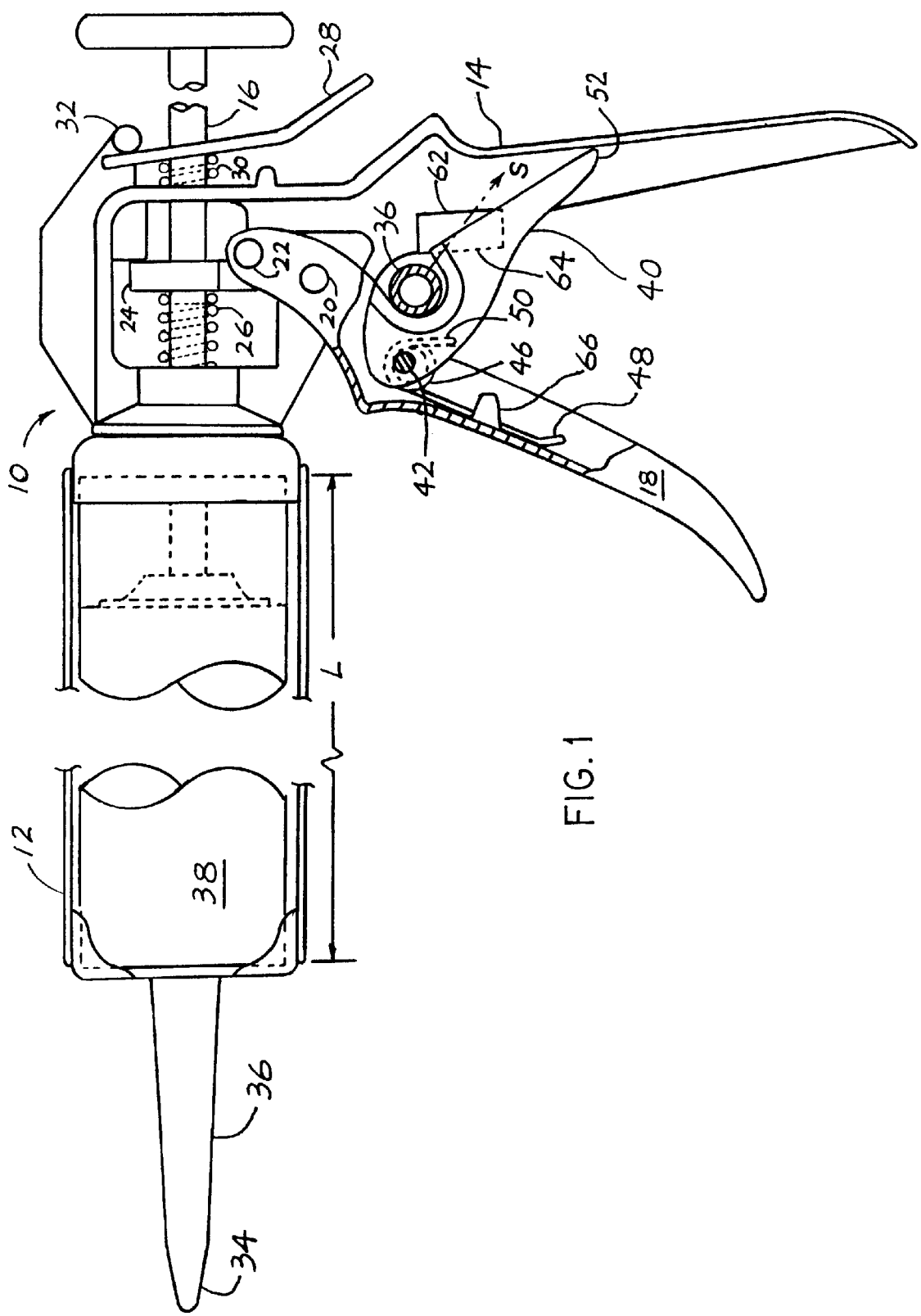
FIG. 1 is a side elevational view of the caulking gun having a built-in cutter according to the present invention, and a caulking cartridge being loaded in the gun.

This invention is directed to a caulking gun having a built-in cutter for smoothly cutting the tip off the spout of a caulking cartridge from either right side and left side of the caulking gun. With reference to FIG. 1 of the drawing, a caulking gun of dispenser 10 has a frame 12 for receiving a caulking cartridge with a nominal length L and a non-U-shape handle 14 for holding the caulking gun 10; a plunger shaft 16 axially movable in frame 12 for forwardly urging the caulking material from caulking gun 10; a trigger mechanism which can be moved engaging and forwardly advancing plunger shaft 16 in response to reciprocal operation of the trigger mechanism. The trigger mechanism includes a trigger 18, which can be squeezed around a pivot 20; a pressing member 22, a driving member 24 and a return spring 26. The trigger mechanism has a released position for permitting rearward movement of plunger shaft 16. Caulking gun 10 also has a stop member 28 working together with a stopping spring 30 and its holder 32 to prevent from rearward movement of plunger shaft 16.

Figures 2, 3:
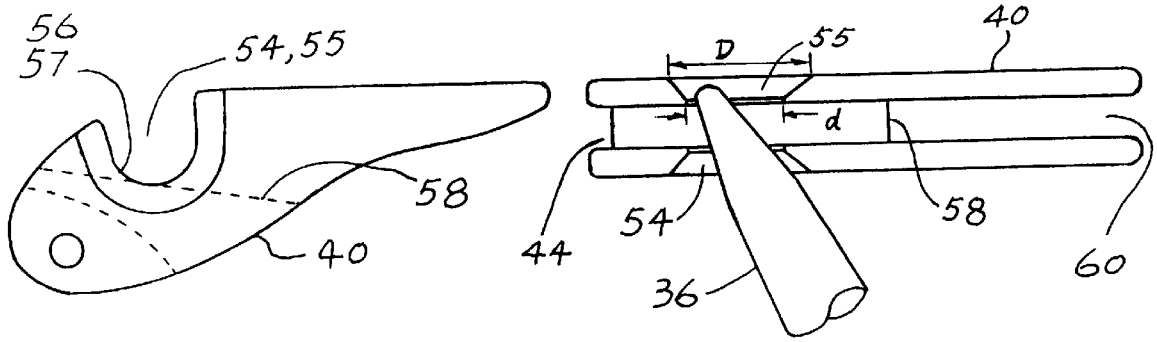
FIG. 2 is a side elevational view of the cutting forwarder of the built-in cutter of the caulking gun of FIG. 1.
FIG. 3 is a top view of cutting forwarder in the caulking gun of FIG. 1.
Figure 4:
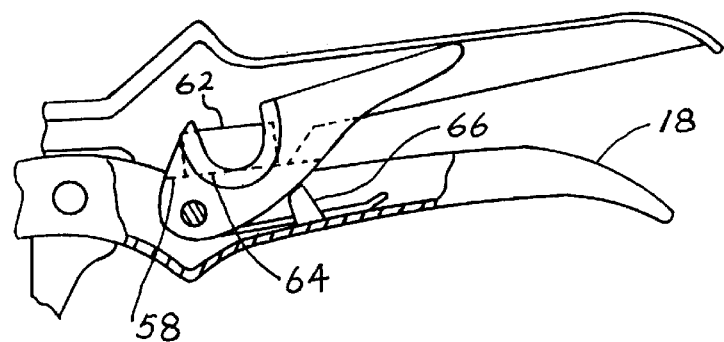
FIG. 4 is a partial of side elevational view of the caulking gun of FIG. 1 when the trigger is squeezed to its extremity position that is the position of finally cutting the tip off of spout.

According to present invention caulking gun 10 has a built-in cutter being formed between handle 14 and movable trigger 18 for cutting a tip 34 off a spout 36 of a caulking cartridge 38 before a caulking job. The cutter includes a cutting blade 62 being mounted on handle 14 and a cutting forwarder 40 of being shown in FIG. 3 beneath cutting blade 62. Cutting forwarder 40 has one end being pivoted inside trigger 18 together with a tension spring 46 inside a slot 44 through a pivot 42 with one spring leg 48 biasing on the inner wall of trigger 18 and another spring leg 50 biasing on bottom of cutting forwarder 40. Thus, the free end 52 of cutting forwarder 40 upwardly reclines against the bottom of handle 14 since the spring force of spring 46 for permitting fee end 52 sliding back and forth along handle 14 in response to movement of trigger 18. FIGS. 1 and 3 show a cutting blade slot 60 on the top of cutting forwarder 40 facing to cutting blade 62 for covering a sharp edge 64 of cutting blade 62 for finger protection of a caulking gun user. As best shown in FIGS. 2 and 3, there are two openings 54 and 55 symmetrically located on the two side walls of cutting blade slot 60 for receiving spout 36 from either right or left side of caulking gun 10 for cutting. Two surfaces 56 and 57 of openings 54 and 55 forcing spout 36 toward cutting blade 62 for cutting when trigger 18 is squeezed. Openings 54 and 55 have a predetermined inside width d and predetermined outside width D which is bigger than inside width d so that spout 36 could be cut with a angle as shown in FIG. 3 for a good caulking job. A flat cutting surface 58 is located on the bottom surface of slot 60 for finally cutting off spout tip 34. As shown in FIGS. 1 and 4 of the drawings there is a cutting pusher 66 being located inside of trigger 18 under cutting forwarder 40. As shown in FIG. 4, when trigger 18 is squeezed from released position to its extremity position cutting pusher 66 pushes cutting forwarder 40 closing up to blade 62, or on the other hand, it pushes cutting surface 58 closing up to sharp edge 64 of cutting blade 62 for completely cutting off tip 34 of spout 36.

A spout cutting process is easier and smoother by using the built-in cutter of present invention. FIG. 1 shows forcing surfaces 56 and 57 of spout receiving openings 54 and 55 push spout 36 toward cutting blade 62 along directions for cutting from one end to another end of cutting blade 62 with an angle between the direction S and sharp edge 64 of blade 62 being less than 90°. Thus, sharp edge 64 of cutting blade 62 slices off tip 34 of spout 36 with an angle between the direction S and sharp edge 64 of blade 62 being less than 90° but not perpendicularly pushes to cut off the spout tip like other kind cutters of caulking guns of prior art. Slicing with an angle less 90° needs smaller force than the force need of perpendicularly pushing to cut.

The free end 52 of cutting forwarder 40 can be forced to open from handle 14 around pivot 42 so that sharp edge 64 of cutting blade 62 can be exposed for sharpening with a file or that slot 60 can be cleaned up. Thus, the built-in cutter can keep good cutting function for a long time.

What I claim as my invention is:

1. A caulking gun comprising:

a. a handle for holding the caulking gun;

b. a frame for receiving a cartridge of caulking material;

c. a trigger for movably operating the caulking gun; and d. a means in response said trigger movement for urging the caulking material out a spout from said caulking cartridge;

e. a blade with a sharp edge being mounted in said handle for cutting off a tip of said spout;

f. a cutting forwarder having one end together with a spring being movably mounted in said trigger and another end reclining against said handle, a slot for covering said sharp edge of said blade, a pair of openings for receiving said spout from either right side or left side of said caulking gun, and a cutting surface in said slot being close to said sharp edge of said blade while said trigger is being squeezed to an extreme position; and g. a pusher being located in said trigger under said forwarder for pushing said forwarder for finally cutting off said tip of said spout.

* * * * *